United States Patent
Shankaranarayanan et al.

(10) Patent No.: US 8,948,791 B2
(45) Date of Patent: *Feb. 3, 2015

(54) LOCATION AND TIME SPECIFIC MOBILE PARTICIPATION PLATFORM

(71) Applicant: AT&T Intellectual Property I, LP, Atlanta, GA (US)

(72) Inventors: Nemmara K. Shankaranarayanan, Bridgewater, NJ (US); Byoung-Jo Kim, Morganville, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/688,159

(22) Filed: Nov. 28, 2012

(65) Prior Publication Data
US 2013/0090981 A1 Apr. 11, 2013

Related U.S. Application Data

(63) Continuation of application No. 12/637,427, filed on Dec. 14, 2009, now Pat. No. 8,335,526.

(51) Int. Cl.
*H04W 24/00* (2009.01)
*G06Q 30/02* (2012.01)
*G06Q 10/06* (2012.01)
(Continued)

(52) U.S. Cl.
CPC ............ *G06Q 30/0201* (2013.01); *G06Q 10/06* (2013.01); *H04W 4/023* (2013.01); *H04W 4/025* (2013.01); *H04L 67/24* (2013.01); *H04L 67/22* (2013.01)
USPC .................. 455/456.5; 455/456.1; 455/456.2; 455/456.3; 455/456.4; 455/456.6; 705/7.29; 705/14.49; 705/7.12; 705/7.13; 705/7.17; 705/7.34

(58) Field of Classification Search
CPC .............. G06Q 30/0247; G06Q 30/02; G06Q 30/0241; G06Q 30/0275; G06Q 20/16; G06Q 10/101
USPC .......... 455/456.1, 456.2, 456.3, 456.4, 456.5, 455/456.6; 705/7.29, 14.49, 7.12, 7.13, 705/7.17, 7.34
See application file for complete search history.

(56) References Cited

U.S. PATENT DOCUMENTS 6,141,570 A 10/2000 O'Neill et al.
6,716,101 B1 4/2004 Meadows et al.
(Continued)

*Primary Examiner* — Sharad Rampuria
*Assistant Examiner* — Sayed T Zewari
(74) *Attorney, Agent, or Firm* — Parks IP Law LLC

(57) ABSTRACT

A mobile participation platform enables a wireless network operator or third party to solicit response data related to a specific time and location specific event by signaling multiple mobile device users that meet predefined qualifications. The qualifications include presence at the specific location at the specific time, and may include other characteristics, such as prior consent to receive solicitations, and particular device type or data collection functionality. The platform locates mobile devices that may qualify for participation, and generates and transmits a solicitation. Mobile devices receiving the solicitation may activate a participation client to acknowledge the solicitation and to contribute by submitting the requested response data, which may include photos, text, sensor data, audio, video and the like. The qualifications are verified, the response data is validated, and anonymity and privacy are maintained by associating the mobile device and other pertinent non-identifying information with an encrypted identifier.

20 Claims, 5 Drawing Sheets

(51) Int. Cl.
*H04W 4/02* (2009.01)
*H04L 29/08* (2006.01)

(56) References Cited

U.S. PATENT DOCUMENTS

| | | |
|---|---|---|
| 7,026,984 B1 | 4/2006 | Thandu et al. |
| 7,999,729 B2 | 8/2011 | Shaw et al. |
| 2003/0201931 A1 | 10/2003 | Durst et al. |
| 2004/0037313 A1 | 2/2004 | Gulati et al. |
| 2004/0111775 P1 | 6/2004 | Zaiger et al. |
| 2005/0040953 A1 | 2/2005 | McDonald |
| 2005/0113124 A1 | 5/2005 | Syrjarinne et al. |
| 2007/0252692 A1* | 11/2007 | Wallace et al. .......... 340/539.26 |
| 2008/0109317 A1* | 5/2008 | Singh .............................. 705/14 |
| 2008/0146890 A1* | 6/2008 | LeBoeuf et al. ............... 600/300 |
| 2008/0306826 A1 | 12/2008 | Kramer et al. |
| 2010/0159955 A1 | 6/2010 | Aerrabotu |
| 2012/0212632 A1* | 8/2012 | Mate et al. ................ 348/207.11 |

* cited by examiner

LOCATION AND TIME SPECIFIC MOBILE PARTICIPATION PLATFORM

TECHNICAL FIELD

The present invention relates generally to wireless communication networks and more specifically, to systems and methods for collecting location and time specific data from mobile devices.

BACKGROUND

Advanced technologies incorporated into today's personal communication devices have vastly expanded opportunities for mass collaboration, which has become known as crowdsourcing. Crowdsourcing refers generally to distributing tasks by soliciting the participation of loosely defined groups of individual contributors, rather than by establishing formal employment or contractual relationships to secure the labor. A group of contributors may include, for example, individuals responding to a solicitation posted on a certain website, or individuals who are targeted for market research by some other means. Each contributor may perform one or more tasks that generate data that contribute to a defined result, such as proofreading part of a digital version of an ancient text or analyzing a small quantum of a large volume of data. The contributors may also gather and submit data that can be compiled to establish the existence of trends or conditions, such as traffic density. Each contributor may be compensated for the contribution, or participation may be rewarded with intangibles such as personal satisfaction or gaining valuable experience.

Typical crowdsourcing systems and methods indiscriminately accept participation of the contributors, and are limited to static objectives. When implemented in the context of mobile (i.e., portable, wireless and/or otherwise battery-powered) communication devices such as wireless telephones, laptops and PDAs, a potential contributor actively seeks out opportunities by accessing crowdsourcing websites, or makes the wireless communication device available at all times to receive alerts when opportunities are available. Both alternatives tax battery power and may increase data charges or encumber device resources, so crowdsourcing can be unattractive to device users. Furthermore, crowdsourcing from mobile contributors can create challenges for data solicitors who may wish to dynamically target contributors and define objectives.

Finally, indiscriminate crowdsourcing can increase the load on the communications network when unnecessarily large numbers of users are solicited.

SUMMARY

The various embodiments of the systems and methods of the mobile participation platform efficiently utilize communication networks and resources to facilitate the solicitation and collection of data from anonymous contributors that meet specified criteria, including proximity to a particular location or type of location at a particular time. The mobile participation platform is particularly useful for data collection in response to the existence of a transient condition, about which useful data can be secured from contributors that are particularly well situated to provide pertinent information about the transient condition. Advantageously, the mobile participation platform provides the capability to validate response data from contributors without revealing their identities to the solicitor of the data, so that privacy is maintained without sacrificing data integrity.

The transient condition may be a temporary although scheduled occurrence, such as an entertainment or sports event, or political rally. Occurrence of the transient condition may be spontaneous or unexpected, such as a natural disaster, celebrity sighting, accident or crime. The transient condition may be entirely defined by the solicitor of the data. For at least these scenarios, a targeted solicitation for contributors that are in proximity to the transient condition would be tailored to result in collection of valuable and useful information for the solicitor. Accordingly, systems and methods are provided to identify, detect or specify a transient condition for which data collection is desired, to define criteria to qualify potential contributors as being well-situated to provide the desired data, to alert the qualified potential contributors of the opportunity to participate, to collect the desired data from the contributors that do participate, to validate the data and the qualifications of the contributors during or after data collection, and to optionally compensate the contributors for participation.

According to one aspect, a contributor registry is provided that contains records associated with potential contributors. Access to the contributor registry can be limited by any suitable means for access control, including authentication protocols, encryption, user-specific filters and access levels, and the like. Access can be limited to mobile network operators or authenticated third party solicitors via a solicitation server component of the mobile participation platform. The contributor registry may be an integral part of or extracted from a communications network database, such as a Home Location Registry (HLR), or the contributor registry may be a separate database. The contributor registry defines the set of subscribers to communications services provided by one or more mobile network operators that have the potential to contribute in response to a solicitation.

In certain embodiments, he contributor registry provides and maintains anonymity of the potential contributors, for example, by keying on a unique and possibly encrypted mobile participation platform identifier (MPP-ID) that is associated with a unique network identifier that is maintained in a subscriber database accessible only by the network operator. Accordingly, the contributor registry may exclude information that would compromise privacy or security of the potential contributors. Encryption of the MPP-ID can be used to prevent unauthorized access and use of data supplied by a single contributor, for example, by tracking the contributor using location data collected in multiple solicitations.

In certain embodiments, the contributor registry contains only records associated with subscribers that have been prequalified to potentially act as contributors. That is, the contributor registry also defines the community of individuals and associated communication devices that meet the most basic qualifications for collaboration, such as those who have provided consent to be solicited, those who have installed requisite client-side software, and who have a suitable device type to enable collaboration. Characteristics that are appropriate prequalifications will vary, depending on the nature of the solicitation.

In certain embodiments, a participation client is installed on or accessible by a mobile device associated with a potential contributor. The participation client facilitates active or passive interaction between the potential contributor and a soliciting entity, hereinafter referred to as the solicitor. The solicitor may be the mobile network operator or a third-party. The solicitor uses a solicitation server to define the transient condition, as well as the prequalifications and the qualifications that must be present for a user to participate as a contributor. As used herein, the terms server and client each refer to a combination of hardware and software that has sufficient processing and communications capabilities to deliver and mediate services between solicitors, mobile network operators and mobile devices. It should be noted that elements of the solicitation server may be distributed in that certain functions may be performed in a system controlled by the mobile network operator, while others are performed in a system that is controlled by a third party solicitor. The software components of the solicitation server and of the participation client include executable instructions that are stored on a computer-readable medium and that are executable by a processor. The hardware components of the solicitation server and of the participation client may include dedicated processing, storage, signaling, transceiving or connecting components, or may consist of shared hardware resources.

Certain aspects are particularly advantageous when the soliciting entity is a third party. In particular, when the soliciting entity is a third party, the solicitation server is local to or remotely accessible by the third party solicitor. The solicitor can control the solicitation and participation process without having direct access to the mobile network operator's systems and customer data, thereby preserving privacy.

In defining the transient condition, the solicitor proactively or reactively specifies a particular location and a particular time that are associated with the transient condition. The location may be precisely identified with a set of coordinates or the like, may be a more loosely defined area, or may be one or more geographic locations that have a certain characteristic. Examples of location characteristics include location type (e.g., movie theaters, arenas, national parks, and the like), ambient conditions (e.g., temperature, wind speed, humidity, and the like), and altitude. Location characteristics enable the solicitor to solicit information from contributors who may be similarly situated, but at different geographic locations. For example, a solicitor may wish to obtain very granular data such as purchase value from users of all mobile devices that are present at shopping malls on the Friday after Thanksgiving in cities in which the temperature is above 50 degrees with no precipitation.

Similarly, the time may be a precisely specified moment, and may be in the past so as to identify potential contributors who witnessed a transient condition that has already occurred. It follows that identification of the transient condition may be reactive, i.e., in response to determining that an event or a condition precedent has occurred.

According to the nature of the transient condition and of the data that the solicitor wishes to collect, certain participation qualifications are derived from the location and time. That is, the solicitor creates a proximity qualification that limits participation to potential contributors that are within a specified distance from the location. The solicitor also creates a coincidence qualification that limits participation to potential contributors that are or were at the location within a specified interval in relation to the time of the occurrence of the transient condition. As used herein, the term coincidence indicates that the mobile device's proximity to the specified location occurred within the specified interval of time. The coincidence qualification may further require that the mobile device was in proximity during a specific part or proportion of the interval.

The nature of the transient condition will determine values for the proximity and coincidence conditions that are appropriate to satisfy the objective of obtaining useful information. For example, if the transient condition is the occurrence of a concert, the solicitor may want the participation only of contributors that were at the venue during the concert. Accordingly, the proximity qualification can be set to encompass the venue and the coincidence qualification can be set to an interval that begins and ends with the concert's scheduled or actual starting and ending time. Other types of transient conditions may dictate tighter constraints on these qualifications. For example, if at the aforementioned concert, the entertainer fell off the stage into the crowd, the solicitor may want the participation only of concert-goers who were actually in the first few rows of the venue at the specific time that the entertainer fell.

With the transient condition and the qualifications identified, a solicitation is generated and transmitted to mobile devices that meet the qualifications, which at minimum, include proximity and coincidence. Those skilled in the art will recognize that any number of other qualifications can be specified in addition.

The solicitation may consist of a request for the active participation of the user of the mobile device, a notification to the user that the device has been selected for passive participation, or a request for the user to enable or decline passive participation. If the user has previously assented to passive participation without notification, then the solicitation may consist of interaction directly with the mobile device without any notification to or action on the part of the user of the mobile device. In such instances, the solicitation may in essence be a handshake in which the solicitation server instructs the mobile device to collect and transmit the desired data. On the other hand, the user may receive notification that passive participation has taken place or will take place, and the user may have an opportunity to veto passive participation or to supply additional contributor data via active means.

Active participation requires some action on the part of the user of the mobile device. For example, the solicitation may begin with notification that the solicitor seeks and is willing to pay for photos taken from mobile devices that satisfy certain proximity and coincidence qualifications that correspond to a crime that has just taken place. A mobile device that is qualified receives the notification, which may automatically launch or generate a prompt to launch the participation client. The participation client informs the user that the solicitation is being made, that collecting and submitting photos relevant to the transient condition (i.e., the crime or the crime scene) are the desired action, that incentives are available, and how to participate. The user can accept the solicitation either by indicating assent, or by performing the requested action. If the user has taken or can take a photo that is relevant, the photo is transmitted according to the instructions for participation, and the incentives are credited or otherwise supplied to the contributor.

As mentioned above, the notification may indicate that passive participation is requested. For example, the participation client may inform the user that unless the user objects, the mobile device camera will be automatically activated and will transmit a video stream to the solicitor.

Notification can be pushed to the device by any suitable known or yet to be developed protocol or medium, including but not limited to Internet Protocol, Bluetooth®, SMS (Short Message Service), EMS (Enhanced Messaging Service) and MMS (Multimedia Message Service), network signaling or paging protocols, and the like. For example, certain embodiments utilize Blackberry® Push Email, Apple® Push Notification service, Microsoft® Exchange ActiveSync Direct Push Technology, or AJAX (Asynchronous JavaScript and XML) via web browsers. Similarly, contributor data can be transmitted from the mobile device via any suitable known or yet to be developed protocol or medium.

The solicitation client may define a transient condition of interest regardless of the presence or absence of mobile devices in the location at the time, thereby generating the solicitation in reaction to the existence of the transient condition. For example, the solicitor may not know how many potential contributors meet proximity and coincidence qualifications, just that a transient condition of interest has occurred or will occur.

Alternatively, the solicitor may react to characteristics of users by generating a solicitation in response to detecting those characteristics, which may include concentration, mobile device activity level, speed, trajectory, and the like. Alternatively, the solicitor may declare the existence of a transient condition on the basis of a certain concentration or combination of users being in a particular place at a particular time. For example, if a large crowd of users start using mobile devices simultaneously in a single location, a solicitation might consist of the question "what's going on?" or "what are you doing right now?" As another example, upon detecting a large number of users rushing toward or away from a location, the solicitor may generate a solicitation asking users to contribute response data (e.g., text, photos, audio, video, etc.) that will explain what caused the unusual traffic pattern.

The solicitation may be relayed by the mobile network operator or transmitted directly by the solicitor to mobile devices that meet those and other qualifications. Optionally, the mobile network operator would notify the solicitor of how many mobile devices received the solicitation. Similarly, the response data are relayed or directly submitted to the solicitor.

In certain embodiments, the mobile participation platform enables the solicitor to directly monitor the location of prequalified mobile devices, although subscriber identity may be stripped to protect privacy. However, in certain applications, privacy is not a concern. For example, the mobile participation platform is used to solicit passive contributions of location and time specific response data from mobile devices associated with animals or vehicles instead of cell phone users. As another example, the solicitor may be the employer of the mobile device users that are solicited, and may require the employees to respond to the solicitation with data that also identifies the device and/or user (e.g., the solicitor is the operator of a trucking company that solicits log data if a driver enters a location that is a rest area during the worker's shift).

DETAILED DESCRIPTION

As required, detailed embodiments of exemplary systems and methods are provided herein. The disclosed embodiments are merely examples that may be embodied in various and alternative forms, and combinations thereof. As used herein, for example, exemplary, and similar terms, refer expansively to embodiments that serve as an illustration, specimen, model or pattern. The figures are not necessarily to scale and some features may be exaggerated or minimized, such as to show details of particular components. In some instances, well-known components, systems, materials or methods have not been described in detail in order to avoid obscuring the devices and methods of the present disclosure. Therefore, specific structural and functional details disclosed herein are not to be interpreted as limiting, but merely as a basis for the claims and as a representative basis for teaching one skilled in the art to variously employ the present disclosure.

Figure 1:
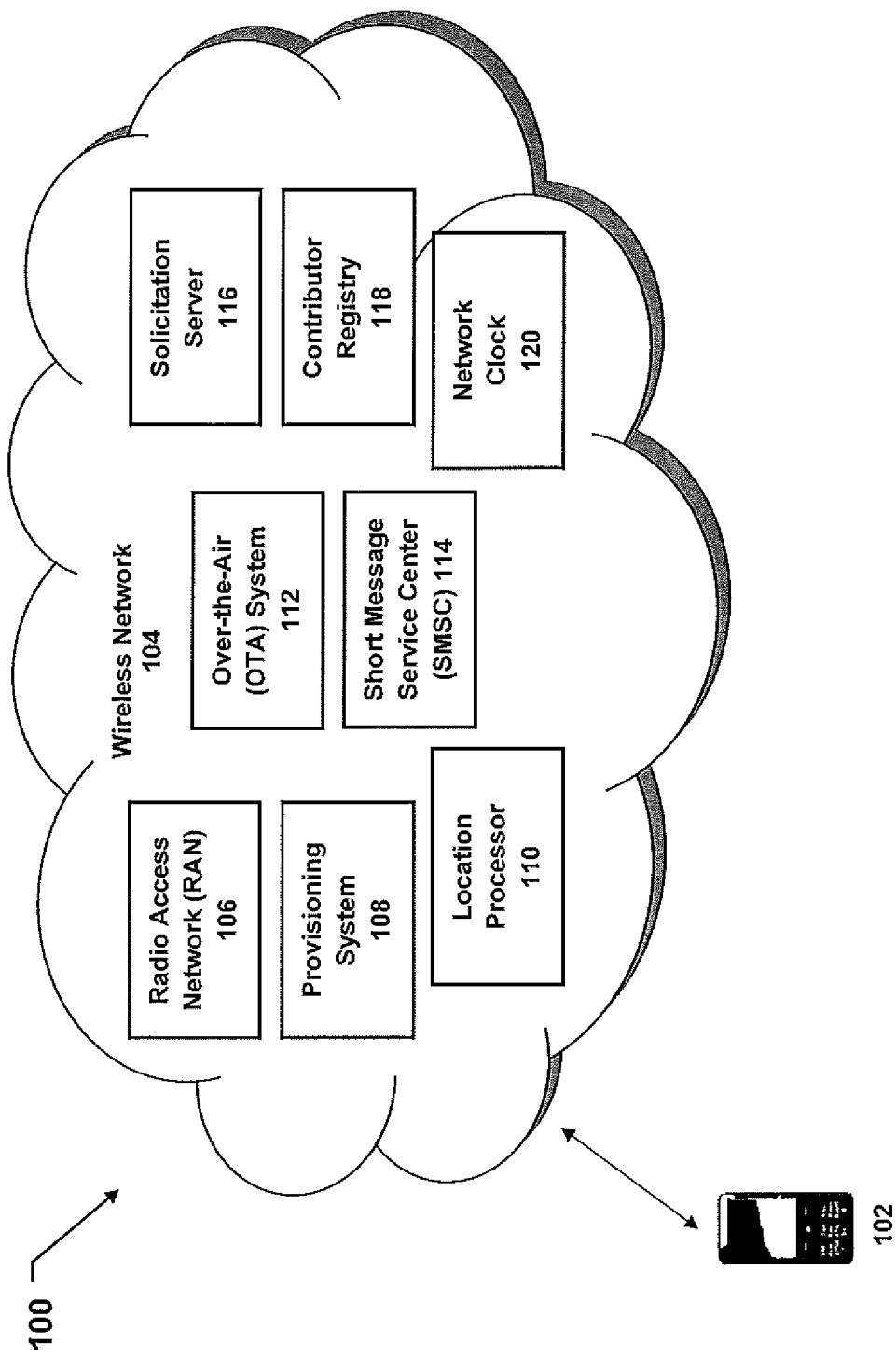
FIG. 1 illustrates an exemplary wireless communications system.

Referring now to FIG. 1, the mobile participation platform, which includes various components, systems, and associated methods, can be implemented in any a suitable environment, such as exemplary wireless communications system 100. As illustrated, the communications system 100 includes a mobile device 102, which is any suitable portable communication and processing device such as a cellular telephone, wireless messaging device, computer of any form factor (e.g., laptop, notebook, netbook, PDA, etc.), or the like. The mobile device 102 may be configured with a fixed or removable network access card (not shown).

The illustrated mobile device 102 is in communication with a wireless network 104. As described above, the wireless network 104 may operate according to GSM and UMTS standards or other suitable telecommunications technologies. The illustrated wireless network 104 includes a radio access network (RAN) 106. The RAN 106 includes at least one base transceiver station (BTS) (not shown), which are commonly referred to as cell towers. A BTS provides the air/radio interface by which a mobile device communicates wirelessly with the wireless network 104. Each BTS is in communication with a base station controller (BSC) (not shown). A BSC allocates radio resources to the mobile device 102, administers frequencies, and controls handovers between BTSs. A BSC communicates with a circuit-switched core network and packet-switched core network via a mobile switching center (MSC) and serving GPRS support node (SGSN), respectively. The BTSs, BSC, MSC, SGSN and other elements of the core networks are not illustrated so as not to distract from the various aspects of the present disclosure.

The wireless network 104 also includes a provisioning system 108, a location processor 110, an over-the-air (OTA) system 112, a short message service (SMS) center (SMSC) 114, a solicitation server 116, a home location register (HLR) 118, and a network clock 120. The functions of these network elements will be described in greater detail. It should be understood that, in some embodiments, functions described below as being performed by one network element may alternatively be performed by another network element. In one embodiment, the solicitation server 116 or the functions thereof are combined with the location processor 110, or vice versa. In another embodiment, the OTA system 112 and provisioning system 108 are combined. In other embodiments, the OTA system 112 and SMSC 114 are combined. Other combinations of the illustrated network elements that would be logical to improve performance, reduce costs, or facilitate easier maintenance are contemplated.

Figures 2, 4:
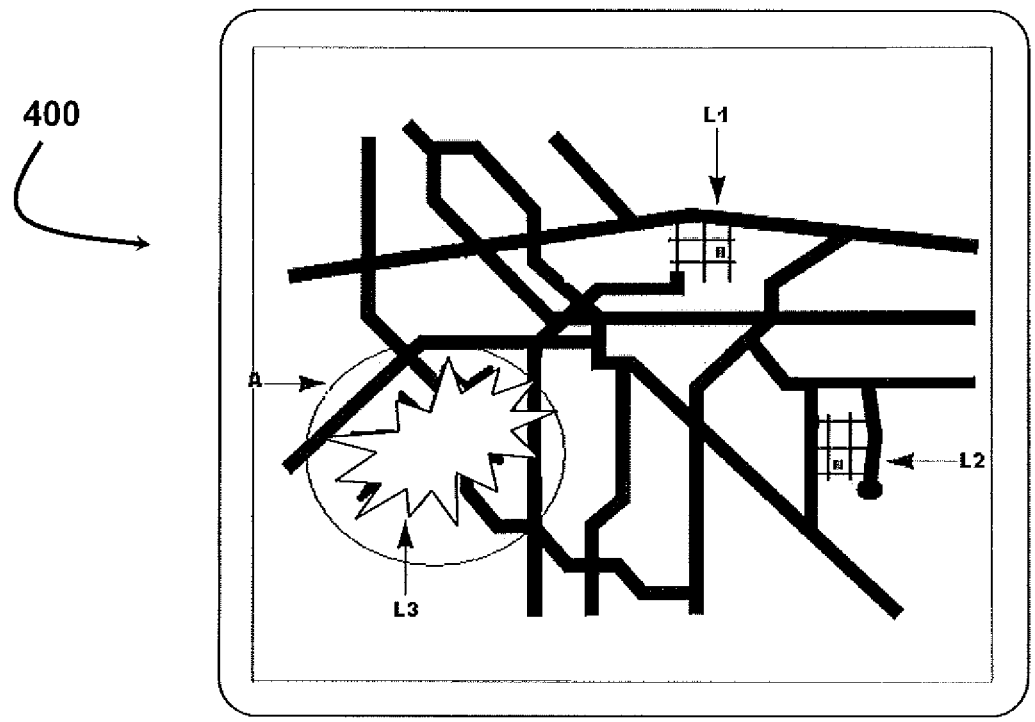
FIG. 2 illustrates an exemplary contributor database.
FIG. 4 is a generalized representation of a monitored geography.

Referring now to FIG. 2, the mobile device 102 is associated with at least one record 200 in the contributor registry 118. The contributor registry 118 contains records 200 associated with potential contributors, which ideally have been prequalified as potential contributors. Each record includes various fields containing data associated with the potential contributor, such as but not limited to, a user identifier and a device identifier. Each record 200 contains at number of fields, any of which may consist of more than one datum. At minimum, each record includes a unique user identifier (user ID) 202 or device identifier (device ID) 204, either of which can be used to obtain the other from another database, such as an HLR (not shown). Either or both the user ID 202 or the device ID 204 may include a mobile participation platform identifier (MPP-ID). As mentioned above, the contributor registry 118 may be independent, may coexist in a communications network database such as the HLR (i.e., may be the same database), or may be extracted from a preexisting database as a view, table or result set of a query.

Each record 200 may include any number of additional fields. For example, each record may include prequalification data 206, past participation data 208, incentive schedule coding 210, device type data 212, data plan information 214, device status data 216, and the like.

Prequalification data 206 establish that threshold qualifications are met. In particular, crowdsourcing raises issues of privacy and consent, so a threshold qualifier may be a consent field that indicates that the potential contributor has agreed to be alerted and solicited, as well as a solicitation type field determine the type of solicitation to which the user has the willingness or capability to respond. As an option, consent can be requested and obtained on-the-fly at regular intervals, or when a potential contributor is alerted to a particular solicitation, particularly when new or widely variable types of collaboration are sought. Crowdsourcing also presupposes use by the potential contributor of a communication device having the requisite data collection and communication capabilities, so other threshold qualifiers may include device type and level of activation of its available functionality. Accordingly, exemplary prequalification data 206 includes flags indicating the giving by the user of consent to be contacted for solicitations, presence of always-on broadband IP data connectivity, location capability such as GPS, and configurations and device features such as sensors, transducers, accelerometers, light meters, micro-projectors, accurate time-keeping devices, and the like. Past participation data 208 includes information such as history of participation in past solicitations, quality and frequency of participation, incentives earned for past participation and the like. Additional information can be maintained and updated as needed, including demographic data.

Figure 3:
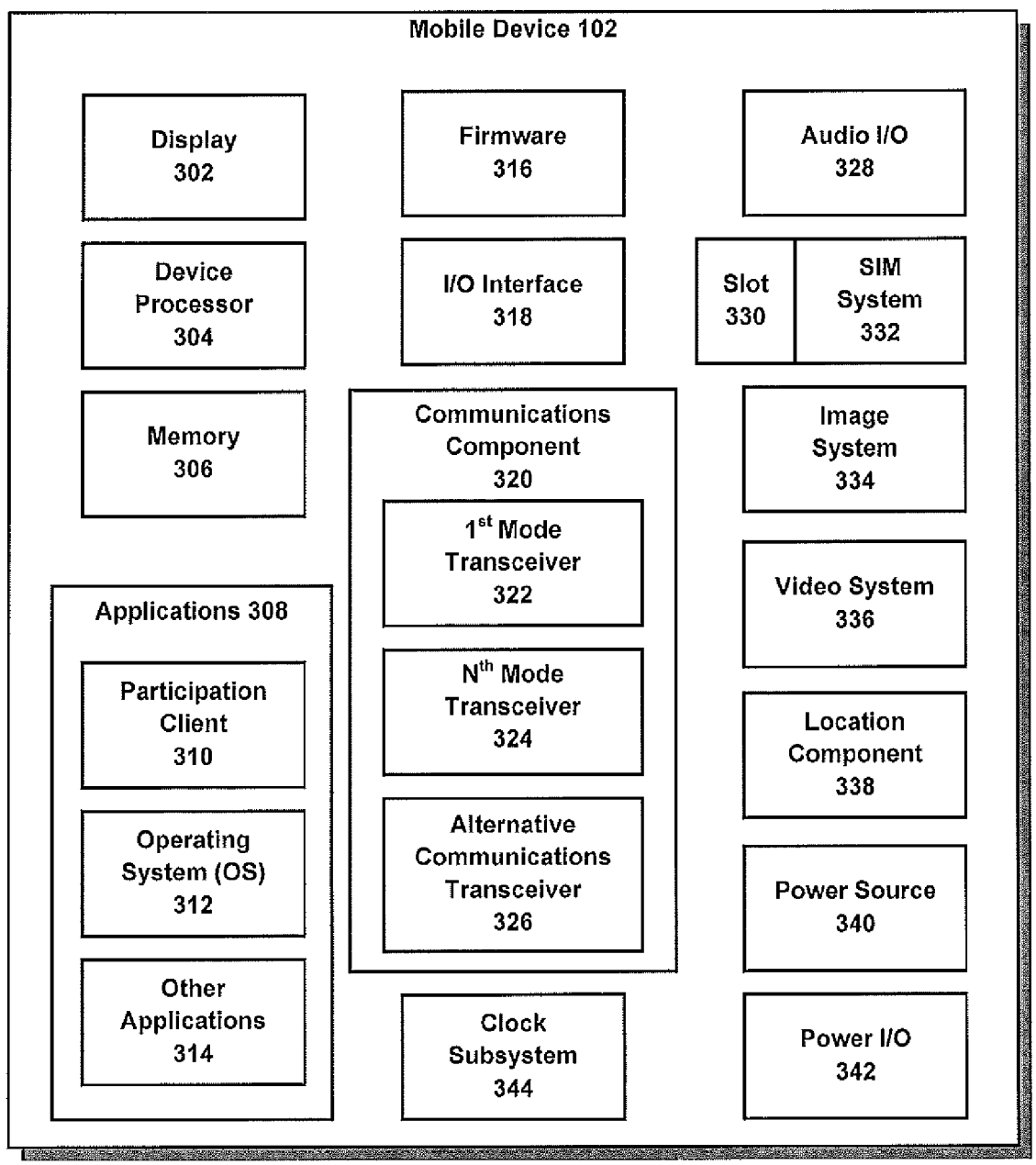
FIG. 3 is a block diagram illustrating some of the components of an exemplary mobile device.

Referring now to FIG. 3, a schematic block diagram of one possible configuration of the mobile device 102 is illustrated. Although connections are not shown between the components illustrated in FIG. 3, the components can interact with one another to carry out device functions. In some embodiments, for example, the components are arranged so as to communicate via one or more busses (not shown). It should be understood that FIG. 3 and the following description are intended to provide a general understanding of a suitable environment in which the various aspects of some embodiments of the present disclosure can be implemented.

In this configuration, the mobile device 102 is a multimode handset with a variety of computer readable media, including, for example, volatile media, non-volatile media, removable media, and non-removable media. The term computer-readable media and variants thereof, as used in the specification and claims, refer to storage media and communication media. Storage media may include volatile and/or non-volatile, removable, and/or nonremovable media, such as, but not limited to random access memory (RAM), read-only memory (ROM), electrically erasable programmable read-only memory (EEPROM), solid state memory or other memory technology, CD ROM, DVD, or other optical disk storage, magnetic tape, magnetic disk storage or other magnetic storage devices, or any other medium that can be used to store the desired information and that can be accessed by the mobile device 102.

As illustrated in FIG. 3, the mobile device 102 includes display 302 for conveying multimedia content such as application graphical user interfaces (GUIs), text, images, video, telephony functions, such as Caller ID data, setup functions, menus, voicemail message waiting identifiers (MWIs), music, metadata, messages, wallpaper, graphics, Internet content, device status, preferences settings, map and location data, profile (e.g., vibrate, silent, loud) selection, and the like. The illustrated mobile device 102 also includes a device processor 304 for processing data and/or executing computer-executable instructions of one or more applications 308, and a memory 306 for storing data and/or one or more of the applications.

In some embodiments, the applications 308 include a participation client 310. The participation client 310 interfaces with an operating system (OS) 312 to facilitate user control or awareness of interaction between the solicitation server 116 and device functionality and data. In some embodiments, the OS 312 is one of Symbian OS, Microsoft® Windows® Mobile OS (available from Microsoft® Corporation of Redmond, Wash.), Palm® webOS™ (available from Palm® Corporation of Sunnyvale, Calif.), Palm® OS (available from Palm® Corporation), RIM® BlackBerry® OS (available from Research In Motion Limited of Waterloo, Ontario, Canada), Apple® iPhone® OS (available from Apple® Corporation of Cupertino, Calif.), or Google Android™ OS (available from Google™ Inc. of Mountain View, Calif.). These operating systems are merely exemplary of the operating systems that may be used in accordance with the embodiments disclosed herein.

The participation client 310 aids a user in entering message content, viewing received messages (which may be multimedia messages, SMS messages, voicemail messages, visual voicemail messages, and the like), managing messages, answering/initiating calls, entering/deleting data, entering and setting user IDs and passwords for device access, configuring settings, manipulating address book content and/or settings, multimode interaction, interacting with the participation client 312 as well as other applications 314, and the like. In some embodiments, the other applications 314 include, for example, general graphical user interface (GUI) applications, visual voicemail applications, messaging applications (e.g., SMS, EMS, MMS applications), presence applications, text-to-speech applications, speech-to-text applications, add-ons, plug-ins, email applications, music applications, video applications, camera applications, location service applications (LSAs), power conservation applications, game applications, productivity applications, entertainment applications, enterprise applications, combinations thereof, and the like. The executable instructions that implement the applications 308 are stored in computer-readable media in either or both the memory 306 and firmware 316, and are executed by the device processor 304. The firmware 316 generally controls basic functions of the mobile device 102, such as its power-up and soft-reboot operations, and may but does not necessarily reside in read-only media.

The illustrated mobile device 102 also includes an input/output (I/O) interface 318 for input/output of data, such as, for example, voicemail account information requests, visual voicemail management, location information, presence status information, user IDs, passwords, and application initiation (start-up) requests. In some embodiments, the I/O interface 318 utilizes a hardwired connection, such as, for example, a USB, mini-USB, audio jack, PS2, IEEE 1394, serial, parallel, Ethernet (RJ48) port, RJ11 port, or the like. In some embodiments, the I/O interface 318 accepts other I/O devices (602, below) such as, keyboards, keypads, mice, interface tethers, stylus pens, printers, thumb drives, touch screens, multi-touch screens, touch pads, trackballs, joysticks, microphones, remote control devices, monitors, displays, liquid crystal displays (LCDs), combinations thereof, and the like. It should be appreciated that the I/O interface 318 may be used for communications between the mobile device 102 and a network or local device, instead of, or in addition to, a communications component 320.

The communications component 320 interfaces with the processor 304 to facilitate wired/wireless communications with external systems. Example external systems include, but are not limited to, intranets, network databases, network storage systems, cellular networks, location servers, presence servers, Voice over Internet Protocol (VoIP) networks, local area networks (LANs), wide area networks (WANs), metropolitan area networks (MANs), personal area networks (PANs), and other networks. In some embodiments, the communications component 320 includes a multimode communications subsystem for providing cellular communications via different cellular technologies. In some embodiments, for example, a first cellular transceiver 322 operates in one mode, such as, GSM, and an Nth cellular transceiver 324 operates in a different mode, such as UMTS. While only two cellular transceivers 322, 324 are illustrated, it should be appreciated that a plurality of transceivers can be included.

The illustrated communications component 320 also includes an alternative communications transceiver 326 for use by other communications technologies such as, for example, WIFI, WIMAX, BLUETOOTH, infrared, infrared data association (IRDA), near field communications (NFC), radio frequency (RF), and the like. In some embodiments, the communications component 320 also facilitates reception from terrestrial radio networks, digital satellite radio networks, Internet based radio services networks, combinations thereof, and the like.

The communications component 320 processes data from a network such as, for example, the Internet, an intranet, a home broadband network, a WIFI hotspot, and the like, via an ISP, DSL provider, or broadband provider. In some embodiments, the communications component 320 facilitates the transmission of authentication and data validation information from the mobile device 102 to a network for processing. Audio capabilities for the mobile device 102 can be provided by an I/O device such as audio I/O component 328, which includes a speaker for the output of audio signals and a microphone to collect audio signals.

The illustrated mobile device 102 also includes a slot interface 330 for accommodating a subscriber identity system 332 such as, for example, a subscriber identity module (SIM) card or universal SIM (USIM) card. Alternatively, the subscriber identity system 332 may be manufactured into the device 300, thereby obviating the need for a slot interface 330. In some embodiments, the subscriber identity system 332 is programmed by a manufacturer, a retailer, a user, a computer, a network operator, or the like. The subscriber identity system 332 may be configured to store voicemail account information, such as voicemail passwords and pilot numbers.

The illustrated mobile device 102 also includes an image capture and processing system 334 (image system). Photos may be obtained via an associated image capture subsystem of the image system 334, for example, a camera. The illustrated mobile device 102 also includes a video system 336 for capturing, processing, recording, modifying, and/or transmitting video content. Photos and videos obtained using the image system 334 and the video system 336, respectively, may be added as message content to an MMS message and sent to another mobile device.

The illustrated mobile device 102 also includes a location component 338 for sending and receiving signals such as, for example, GPS data, assisted GPS (A-GPS) data, WIFI/WIMAX and cellular network triangulation data, combinations thereof, and the like, for determining a location of the mobile device 102. In some embodiments, the location component 338 interfaces with cellular network nodes, telephone lines, satellites, location transmitters and/or beacons, wireless network transmitters and receivers, for example, WIFI hotspots, radio transmitters, combinations thereof, and the like. Using the location component 338, the mobile device 102 obtains, generates, and/or receives data to identify its location, or transmits data used by other devices to determine the location of the mobile device 102. The illustrated mobile device 102 also includes a power source 340, such as batteries and/or other power subsystem (AC or DC). The power source 340 can interface with an external power system or charging equipment via a power I/O component 342.

The illustrated mobile device 102 also includes a device clock 344 that determines current time. In some embodiments, the device clock 344 is synchronized with or in relation to the network clock 120, which provides the current time to the solicitation server 116. In other words, the offset between the device clock 344 and the network clock 120 is known, which enables the platform to specify coincidence times with a high level of precision.

Accordingly, the mobile device 102 is well equipped with components and interfaces that enable reception, collection and transmission of audio, video and alphanumeric data. In certain embodiments, in addition to the I/O components (including audio I/O 328, image system 334, video system 336, and display 302), the mobile device 102 is further equipped with components that sense or otherwise collect other data, such as 1) from the external environment: light, motion, temperature, magnetic fields, gravity, humidity, vibration, pressure, presence of certain molecules, and electrical fields, 2) from the mobile device: internal device temperature and magnitude of fields generated, and 3) from the user: metabolic data and vital signs (e.g., glucose level, oxygen level, body temperature, heart rate, respiration, and the like) and internal chemistry (e.g., presence of hormones, neurotransmitters, pathogens, and the like). Such biometric measurements are particularly useful in applications that seek to determine the response to certain stimuli or conditions. For example, the solicitor can learn whether a ringing cell phone raises the heart rate of its user by securing advance permissions to collect that data whenever the user's phone rings. As another example, a solicitor may want to learn how the vital signs of birds equipped with cellular transceivers change when the birds are located within a power substation.

With reference to FIG. 4, using any suitable known or yet to be developed monitoring and geolocation technologies, a solicitor monitors or selects a particular geography 400 as relevant with respect to the occurrence of one or more transient conditions. As used herein, a transient condition is simply the existence of a scenario that is associated with a particular location and time, and that generates response data that is collectable at that location and time, or from a mobile device that was present at that location and time. The transient condition can be triggered by an event or can be defined as a premise. For example, a solicitor may define a transient condition to identify any location at an elevation of 2000 feet or greater at which the temperature is less than 28 degrees at noon on Aug. 21, 2009. It follows that the same transient condition can be found at more than one location.

Figure 5:
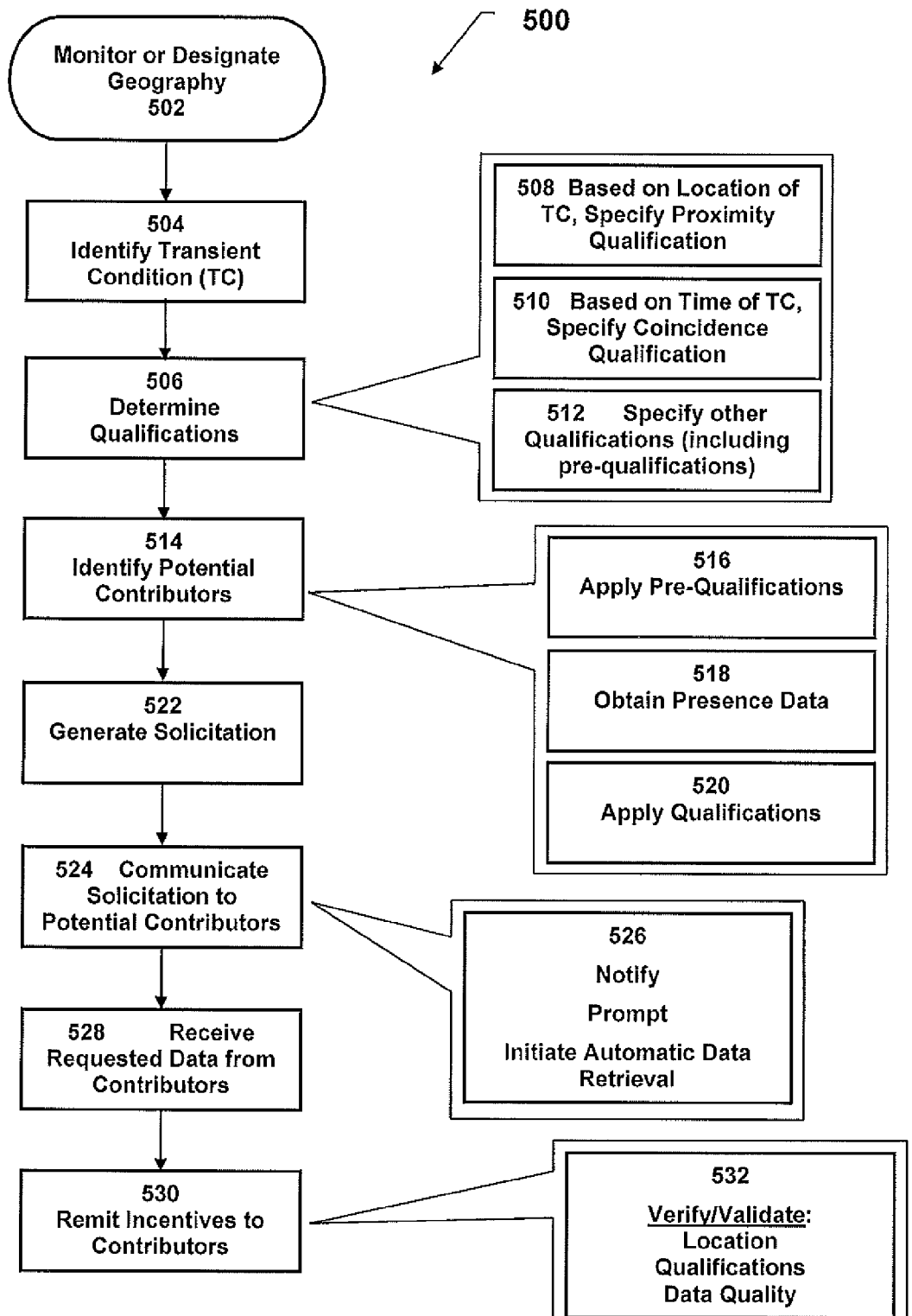
FIG. 5 is a flowchart illustrating an exemplary method for soliciting the participation of contributors via a mobile participation platform.

FIG. 4 is a generalized representation of the monitored geography 400, the representation of which may be for example, generated and displayed on a screen by an application associated with or running on the solicitation server 116. Referring also to FIG. 5, an exemplary method 500 for implementing the mobile participation platform is described, starting at step 502 with selecting a geography 400 to be monitored or designated for possible solicitations. The geography 400 may be defined as desired, such as by a particular set of map coordinates, political subdivision (e.g., city, state, country, and the like), wireless network subdivision, cell (i.e., area of radio coverage in a cellular network) or group of cells, mobile network coverage area, and the like.

At step 504, a transient condition is identified at one or more locations L. For example, in FIG. 4, transient conditions have been detected or specified at locations L1, L2, and L3. Location L1 is a neighborhood bounded by several specific streets. Location L2 is another neighborhood bounded by streets and highways. Location L3 is defined by the extent of an occurrence that has irregular boundaries. As described above, the definition of what constitutes a transient condition depends on the specifications of the solicitor.

At step 506, the solicitor designates as qualifications certain characteristics of users or mobile devices that will (in step 514) identify potential contributors that are well situated to provide useful data about at least one transient condition identified at step 504. Ideally, the characteristics are tailored to the particular transient condition to optimize the value or quality of the response data contributed. In some instances, data optimization will be balanced with cost that will be incurred in paying incentives or in transmitting a solicitation or receiving the response data.

At minimum, the step of designating qualifications will include specifying a proximity qualification (step 508) and specifying a coincidence qualification (step 510). To define the proximity qualification, the location L of the transient condition is determined and expressed via any known or yet to be developed geolocation technology and means for expressing location (e.g., coordinate system, cartography, grid systems, plans, maps, and the like). Based on the location L associated with the transient condition, the proximity qualification is defined to limit participation to mobile devices that are wholly or partially in the location or wholly or partially within an expanded area A that encompasses the location L. The area A may determined, for example as being within a specified radius of the center point of the location L.

The coincidence qualification is defined to limit participation to mobile devices that meet the proximity qualification at a time associated with the transient condition (e.g., start time, end time, time detected, and the like). The coincidence qualification may be a window of time such that the requisite proximity occurs wholly during, partially during, or within a certain interval of the time specified by the solicitor.

At step 512, all qualifications are specified. Some of these may be prequalifications that were specified and applied prior to step 502 or step 504 to limit the pool of potential contributors. As such, it is clear that the steps in method 500 needn't be performed in the order shown, and that some steps can be partially performed at one time and completed at another time.

Similarly, identification of potential contributors (step 514) can occur at least in part in advance of the occurrence of the transient condition by applying pre-qualifications to define or select from records in the contributor registry 116 (step 516). In step 518, the solicitation server 116 obtains presence data to determine the location (present, or at the time of the transient condition) of potential contributors. To do so, the approximate location of each prequalified potential contributor is determined using any known or yet to be developed protocol for locating mobile devices, such as by interrogating the HLR and/or VLR in which the mobile device is registered. The approximate presence data will include an approximate time as well.

Each of the potential contributors determined to have approximate presence data that corresponds to a location that at least nearly satisfies the proximity qualification receives a preliminary alert that instructs the mobile device to wake up and perform more accurate location determination. This more accurate presence data can be secured with or without any knowledge of the potential contributors, depending on the privacy level desired. In certain embodiments, the location is validated only if the approximate and more accurate locations are consistent.

Referring back to FIG. 4, as potential contributors are located either approximately or precisely, representations (not shown) may appear via the interface generated by the solicitation server and may be superimposed over the geography 400, to give the solicitor a visual indication of the number of potential contributors that meet the qualifications. To increase or decrease the number of potential contributors that are eligible, the solicitor may add, subtract, or alter qualifications and their values on the fly.

At step 520, all other qualifications are applied, which ideally occurs either before or after the more accurate locations are determined, but not before the approximate locations are determined. In other words, to preserve system resources, it is desirable to minimize the number of records involved in each query of the contributor registry 118. Accordingly, approximate locations are used to disqualify potential contributors before comparing the data fields in its records 200 to all of the qualifications determined in step 506.

The proximity qualification can be applied by the mobile network operator, in which case, the locations of mobile devices are determined by the mobile network operator and can be withheld or stripped of identifying data to maintain privacy or anonymity.

Before, after, or during identification of potential contributors at step 514, the method at step 522 generates the solicitation that will be communicated to the potential contributors that meet the designated qualifications. The solicitation may be developed and formatted according any known or yet to be developed communications protocol.

At step 524, the solicitation is communicated to the potential contributors that are qualified to respond. In the exemplary embodiments, the solicitation is transmitted using SMS messaging and signaling protocols, although it should be readily appreciated that solicitations can be communicated in any number of ways, including via voice calls, data sessions, multimedia messages, and the like. In step 526, and with further reference to FIG. 6, transmitting the solicitation may have the objective of notifying the potential contributors by displaying the basic information associated with the alerts, prompting the potential contributor to launch the participation client 310 to check for alerts (short messages that indicate that a solicitation is outstanding), automatically initiating passive contribution by automatically retrieving data from the mobile device 102, or by any combination of notification, prompting, pushing data, pulling data, or other interaction between the solicitor and the potential contributor.

Figure 6:
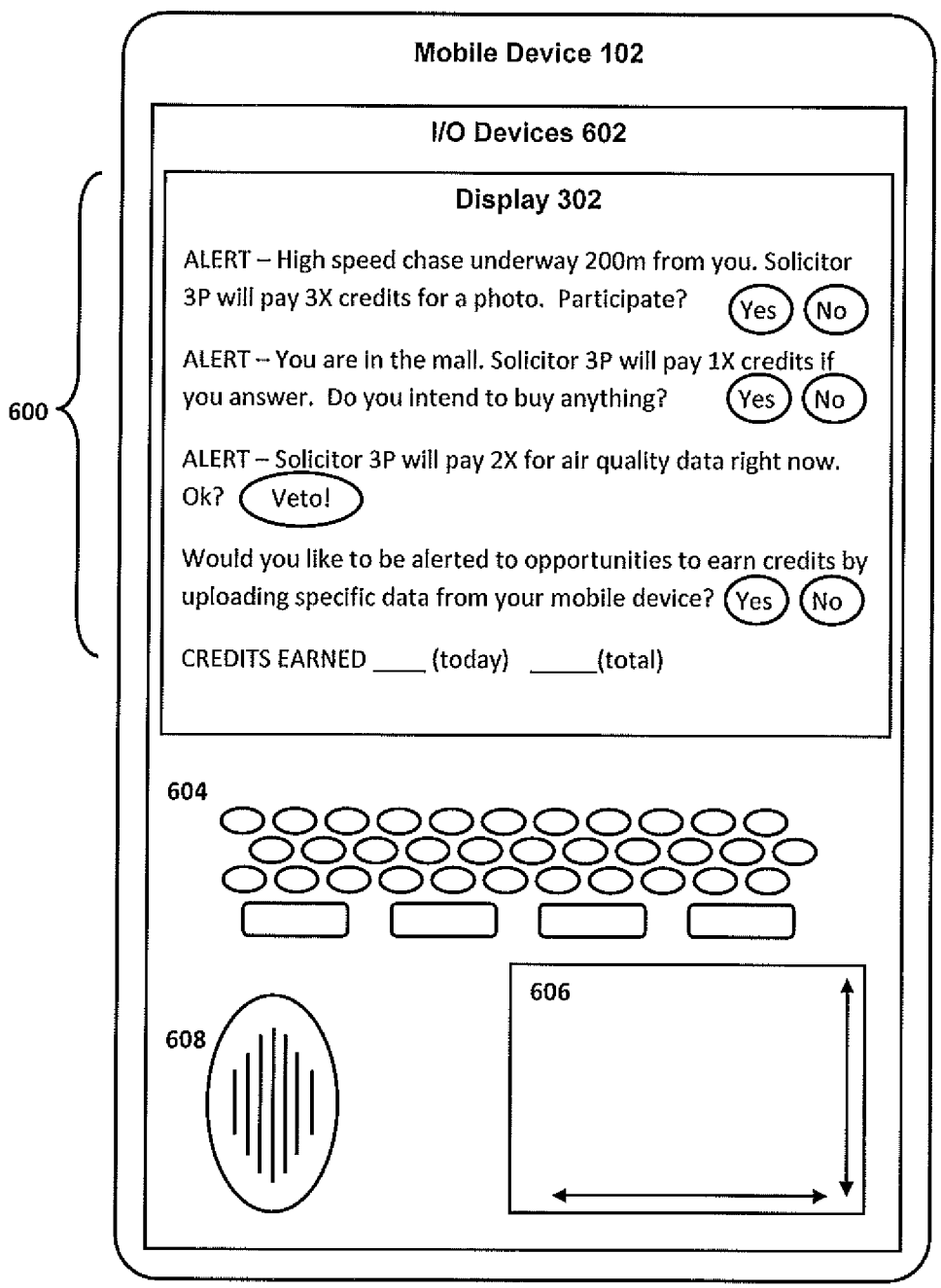
FIG. 6 is a simplified diagram illustrating input and output devices and interfaces of exemplary mobile device.

At step 528, and with further reference to FIG. 6, if the potential contributor agrees or has previously agreed to contribute the requested data, he or she may so indicate by responding to a solicitation via the participation client 310. A response may be an indication of intent to provide the data, such as by clicking YES in response to receiving an alert 600, by vetoing a notification that automatic data retrieval is pending. Alternatively, the response may be communicated simply by the contributor transmitting the requested data either actively or passively. In some situations, the solicitation may specify that the response data must be transmitted within a certain timeframe, in addition to requirement that the response data be collected at a time that satisfies the coincidence qualification.

Referring now to FIG. 6, the display 302 may present alerts that may include relevant information about a solicitation, such as the date, time, type of solicitation, status of solicitation (i.e., new, unread, read, saved, expired, ongoing, accepted, rejected or deleted), and source of solicitation. Additional information about the solicitation may be accessible to the user via successively deeper GUI dialog screens, detail screens or links to webpages. The alerts are accessed using the participation client 310, which may be installed on the mobile device at manufacture, or downloaded, installed or provisioned (such as via the provisioning system 108), either manually or automatically, and either locally or remotely (such as via the OTA system 112).

Referring again to FIG. 5, at step 532, the mobile participation platform performs verification and validation of contributions received to prevent hacking as well as inadvertent or dishonest submission of data by contributors. Some of the verification and validation tasks may be distributed so as to be concomitant with any one or more of the steps of the method 500. As a nonlimiting example, the task of validating the response data to ensure that it conforms to the solicitation may create a condition precedent to crediting incentives, in which case it would be performed before step 530. Verifying the location and coincidence of the collection of response data may be performed, at least in part, prior to communicating the solicitation, or prior to accepting the response data as reliable.

Verification and validation can be accomplished using any suitable means, now known or yet to be developed. In the exemplary embodiment, contributor responses are encrypted using the MPP-ID in the device ID 204. Compliance with coincidence qualification requirements is confirmed by embedding in the contribution packets timestamps and location data generated by the mobile or GPS network.

Verification and validation may also include preemptive measures. For example, in the exemplary embodiment, location data is communicated to the potential contributor in a user-friendly fashion. That is, rather than providing numerical coordinates that can easily be copied and hard-coded by unqualified contributors, the location is communicated using plain language as shown in FIG. 6. For example, the user may be informed of the location of interest by name or type of location (e.g., "by the fountain in the mall"), by distance and trajectory (e.g., "20 yards north of you"), or without specificity in the abstract (e.g., "where you are standing right now").

Returning to FIG. 5, incentives may be paid at step 530. For example, incentives may be in the form of financial, symbolic, or fungible credits, to reward or encourage potential contributors for responding to a solicitation with response data. In some embodiments, incentive payments are conditioned upon validation of the data (i.e., ensuring that the response data is of the type and quality requested), of the contributor's identity, or of the qualifications (i.e., ensuring that the contributor actually met the qualifications, including that the location and coincidence data relied on was accurate).

Incentives need not be consistent from one contributor to the next. Rather, incentive levels for certain types of solicitations and response data may be user-specific and stored in the contributor registry 200 as incentive schedule 210. Furthermore, incentive levels may be impacted by positive or negative past participation data 208, for instance, or according to the importance of the data being requested in a particular solicitation.

In some embodiments, response data is pulled. In other embodiments, response data is pushed or otherwise actively returned by attaching content to messages returned to the solicitor via email, SMS, MMS, direct upload, and the like. The response data can be collected using any or any combination of the mobile device's I/O components, including the keyboard 604, touchpad 606 or other pointing device, and sensor 608.

Among other advantages, it should be noted that all of the transactions with contributors and potential contributors can take place anonymously. More specifically, the identify of an individual person or mobile device need not be revealed, particularly to a third party solicitor, in the course of populating the contributor registry 118, provisioning the participation client 310, identifying or locating potential contributors (at 514), communicating a solicitation (at 524), receiving response data (at 528), and verifying and validating response data (at 532).

The systems and methods of the present disclosure may be implemented in wireless networks that use exemplary telecommunications standards, such as Global System for Mobile communications (GSM) and a Universal Mobile Telecommunications System (UMTS). It should be understood, however, that the systems and methods may be implemented in wireless networks that use any existing or yet to be developed telecommunications technology. Some examples of other suitable telecommunications technologies include, but are not limited to, networks utilizing Time Division Multiple Access (TDMA), Frequency Division Multiple Access (FDMA), Wideband Code Division Multiple Access (WCDMA), Orthogonal Frequency Division Multiplexing (OFDM), and various other 2G, 2.5G, 3G, and above (e.g., 4G and beyond) technologies. Examples of suitable data bearers include, but are not limited to, General Packet Radio Service (GPRS), Enhanced Data rates for Global Evolution (EDGE), the High-Speed Packet Access (HSPA) protocol family, such as, High-Speed Downlink Packet Access (HSPDA), Enhanced Uplink (EUL) or otherwise termed High-Speed Uplink Packet Access (HSUPA), Evolved HSPA (HSPA+), and various other current and future data bearers.

Although certain embodiments are described in the context of wireless communications, the present teachings are equally applicable to when implemented with devices that are not necessarily mobile devices, such as fixed wireless devices (e.g., wireless security system transceivers) and VoIP (voice over internet protocol) devices.

While the methods described herein may, at times, be described in a general context of computer-executable instructions, the methods of the present disclosure can be implemented in combination with other program modules and/or as a combination of hardware and software. The term application, or variants thereof, is used expansively herein to include routines, program modules, programs, components, data structures, algorithms, and the like. Applications can be implemented on various system configurations, including servers, network systems, single-processor or multiprocessor systems, minicomputers, mainframe computers, personal computers, hand-held computing devices, mobile devices, microprocessor-based, programmable consumer electronics, combinations thereof, and the like.

It follows that the embodiments described are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

The invention claimed is:

1. A system, for soliciting response data related to a transient condition, comprising:
a processor; and
a computer-readable medium having stored thereon computer-executable instructions that, when executed by the processor, cause the processor to perform operations comprising:
determining the transient condition based on a characteristic selected from a group of characteristics consisting of an environmental characteristic and a mobile device user characteristic, wherein the mobile device user characteristic does not include solely a location requirement;
identifying mobile devices that meet the transient condition;
obtaining data indicating a solicitor-designated less-accurate proximity pre-qualification and a solicitor-designated more-accurate proximity pre-qualification;
identifying, subsequent to the obtaining operation, mobile devices that meet both the solicitor-designated less-accurate proximity pre-qualification and the solicitor-designated more-accurate proximity pre-qualification; and
generating a solicitation for transmission to at least some of the mobile devices that meet the transient condition, the solicitor-designated less-accurate proximity pre-qualification, and the solicitor-designated more-accurate proximity pre-qualification.

2. The system of claim 1, wherein the operation of identifying the mobile devices that meet both the less-accurate proximity pre-qualification and the solicitor-designated more-accurate proximity pre-qualification comprises determining approximate presence data associated with each of the mobile devices without contacting the mobile devices.

3. The system of claim 2, wherein the operation of identifying the mobile devices that meet both the solicitor-designated less-accurate proximity pre-qualification and the solicitor-designated more-accurate proximity pre-qualification further comprises obtaining more-accurate presence data for only those mobile devices for which the approximate presence data meets the solicitor-designated less-accurate proximity pre-qualification.

4. The system of claim 3, wherein the operation of obtaining more-accurate presence data for the mobile devices for which the approximate presence data meets the solicitor-designated less-accurate proximity pre-qualification comprises requesting the more-accurate presence data from those mobile devices for which the approximate presence data meets the solicitor-designated less-accurate proximity pre-qualification.

5. The system of claim 1, wherein the environmental characteristic comprises an ambient quality, existing at a mobile device location, selected from a group of qualities consisting of: an air temperature; a humidity; a precipitation; a wind speed; a movement in the environment; an electric field; a magnetic field; gravity; a vibration; an air pressure; a presence of one or more pre-identified molecules; and an ambient light.

6. The system of claim 1, wherein the mobile device user characteristic comprises being at a predetermined type of place so that mobile devices located at various geographic locations can meet the mobile device user characteristic at the same time.

7. The system of claim 6, wherein the mobile device user characteristic comprises being located at any one of multiple shopping malls.

8. The system of claim 1, wherein the mobile device user characteristic comprises a characteristic selected from a group of characteristics consisting of: a predetermined metabolic quality; a predetermined vital sign; and a predetermined internal chemistry quality of a user of the mobile device.

9. The system of claim 1, wherein the mobile device user characteristic comprises a characteristic selected from a group of characteristics consisting of: moving at a predetermined speed; the mobile device having a predetermined trajectory; the mobile device being operated at a predetermined activity level; the mobile device being a part of a group of mobile devices together satisfying a predetermined mobile-device group movement requirement; and the mobile device being a part of a group of communication devices together satisfying a predetermined communication-device group usage requirement.

10. A method, for soliciting, from a plurality of mobile devices, response data related to a transient condition, comprising:
determining, by a computer processing unit, the transient condition based on a characteristic selected from a group of characteristics consisting of an environmental characteristic and a mobile device user characteristic, wherein the mobile device user characteristic does not include solely a location requirement;
identifying, by the computer processing unit, mobile devices, of the plurality of mobile devices, that meet the transient condition;
obtaining data indicating a solicitor-designated less-accurate proximity pre-qualification and a solicitor-designated more-accurate proximity pre-qualification;
identifying, by the computer processing unit, mobile devices that meet both the solicitor-designated less-accurate proximity pre-qualification and the solicitor-designated more-accurate proximity pre-qualification; and
generating, by the computer processing unit a solicitation for transmission to at least some of the mobile devices that meet the transient condition, the solicitor-designated less-accurate proximity pre-qualification, and the solicitor-designated more-accurate proximity pre-qualification.

11. The method of claim 10, wherein identifying the mobile devices that meet both the solicitor-designated less-accurate proximity pre-qualification and the solicitor-designated more-accurate proximity pre-qualification comprises determining approximate presence data associated with each of the mobile devices without contacting the mobile devices.

12. The method of claim 11, wherein identifying the mobile devices that meet both the solicitor-designated less-accurate proximity pre-qualification and the solicitor-designated more-accurate proximity pre-qualification comprises obtaining more-accurate presence data for only those mobile devices for which the approximate presence data meets the solicitor-designated less-accurate proximity pre-qualification.

13. The method of claim 12, wherein obtaining more-accurate presence data for the mobile devices for which the approximate presence data meets the solicitor-designated less-accurate proximity pre-qualification comprises requesting the more-accurate presence data from those mobile devices for which the approximate presence data meets the solicitor-designated less-accurate proximity pre-qualification.

14. The method of claim 10, wherein the environmental characteristic comprises an ambient quality, existing at a mobile device location, selected from a group of qualities consisting of: an air temperature; a humidity; a precipitation; a wind speed; a movement in the environment; an electric field; a magnetic field; gravity; a vibration; an air pressure; a presence of one or more pre-identified molecules; and an ambient light.

15. The method of claim 10, wherein the mobile device user characteristic comprises a characteristic selected from a group consisting of:
the mobile device being at a predetermined type of place so that mobile devices located at various geographic locations can meet the mobile device user characteristic at the same time;
a predetermined metabolic quality;
a predetermined vital sign;
a predetermined internal chemistry quality of a user of the mobile device;
the mobile device moving at a predetermined speed;
the mobile device having a predetermined trajectory;
the mobile device being operated at a predetermined activity level;
the mobile device being a part of a group of mobile devices together satisfying a predetermined mobile-device-group movement requirement; and
the mobile device being a part of a group of communication devices together satisfying a predetermined communication-device group usage requirement.

16. The method of claim 10, wherein the environmental characteristic is measured by at least some of the mobile devices.

17. A non-transitory computer-readable storage medium comprising instructions that, when executed by a processor, cause the processor to perform operations comprising:
determining the transient condition based on a characteristic selected from a group of characteristics consisting of an environmental characteristic and a mobile device user characteristic, wherein the mobile device user characteristic does not include solely a location requirement;
identifying mobile devices that meet the transient condition;
obtaining data indicating a solicitor-designated less-accurate proximity pre-qualification and a solicitor-designated more-accurate proximity pre-qualification;
identifying mobile devices that meet both the solicitor-designated less-accurate proximity pre-qualification and the solicitor-designated more-accurate proximity pre-qualification; and
generating a solicitation for transmission to at least some of the mobile devices that meet the transient condition, the solicitor-designated less-accurate proximity pre-qualification, and the solicitor-designated more-accurate proximity pre-qualification.

18. The non-transitory computer-readable storage medium of claim 17, wherein the operation of identifying the mobile devices that meet both the solicitor-designated less-accurate proximity pre-qualification and the solicitor-designated more-accurate proximity pre-qualification comprises determining approximate presence data associated with each of the mobile devices without contacting the mobile devices.

19. The non-transitory computer-readable storage medium of claim 18, wherein the operation of identifying the mobile devices that meet both the solicitor-designated less-accurate proximity pre-qualification and the solicitor-designated more-accurate proximity pre-qualification comprises obtaining more-accurate presence data for only those mobile devices for which the approximate presence data meets the solicitor-designated less-accurate proximity pre-qualification.

20. The non-transitory computer-readable storage medium of claim 19, wherein obtaining more-accurate presence data for the mobile devices for which the approximate presence data meets the solicitor-designated less-accurate proximity pre-qualification comprises requesting the solicitor-designated more-accurate presence data from those mobile devices for which the approximate presence data meets the solicitor-designated less-accurate proximity pre-qualification.

* * * * *